United States Patent [19]

Hobbensiefken

[11] E Re. 28,675

[45] Reissued Jan. 6, 1976

[54] REMOVABLE VEHICLE CHASSIS SUB-FRAME WITH ENGINE

[76] Inventor: Dean Hobbensiefken, Rte. 1, Box 241, Lyons, Oreg. 97358

[22] Filed: July 25, 1974

[21] Appl. No.: 491,922

Related U.S. Patent Documents

Reissue of:

[64] Patent No.: 3,732,942
Issued: May 15, 1973
Appl. No.: 98,625
Filed: Dec. 16, 1970

[52] U.S. Cl. ..... 180/11; 180/56; 180/64 L
[51] Int. Cl. ..... B60k 5/00
[58] Field of Search ..... 180/11, 55, 56, 64 M, 64 L; 280/124 F

[56] References Cited

UNITED STATES PATENTS

| | | | |
|---|---|---|---|
| 696,397 | 4/1902 | Ball | 180/56 |
| 725,394 | 4/1903 | Ball | 180/56 |
| 781,990 | 2/1905 | Ball | 180/56 |
| 783,599 | 2/1905 | Warrington | 180/55 |
| 810,379 | 1/1906 | Pope | 180/56 |
| 1,727,721 | 9/1929 | Langlands | 180/64 L |
| 1,770,279 | 7/1930 | Morrison | 180/11 X |
| 2,013,599 | 9/1935 | Butler | 180/64 M X |
| 2,047,336 | 7/1936 | Stout | 180/11 X |
| 2,383,611 | 8/1945 | Marcy | 180/11 |
| 3,062,309 | 11/1962 | Schwartz | 180/11 |

FOREIGN PATENTS OR APPLICATIONS

| | | | |
|---|---|---|---|
| 147,949 | 2/1904 | Germany | 180/55 |
| 1,941 | 1/1914 | United Kingdom | 180/56 |

*Primary Examiner*—David Schonberg
*Assistant Examiner*—Terrance L. Siemens
*Attorney, Agent, or Firm*—Watson, Cole, Grindle & Watson

[57] ABSTRACT

A heavy duty motor vehicle has a main frame with a forward axle and steerable ground wheels. A power unit sub-frame carrying a rear axle is releasably secured to the main frame, and includes an engine assembly which is located at an intermediate position between the axles. The unit may also include a fifth wheel assembly whereby it becomes a towing vehicle for a further trailer unit or units.

10 Claims, 15 Drawing Figures

INVENTOR
DEAN HOBBENSIEFKEN

BY Kimmel, Crowell & Weaver

ATTORNEYS

FIG. 7
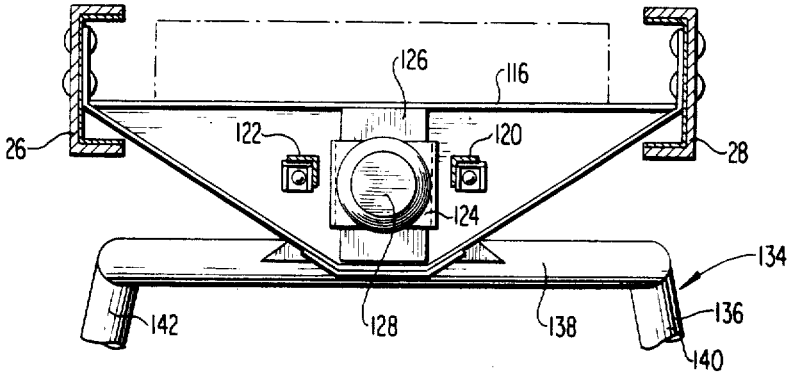
FIG. 8
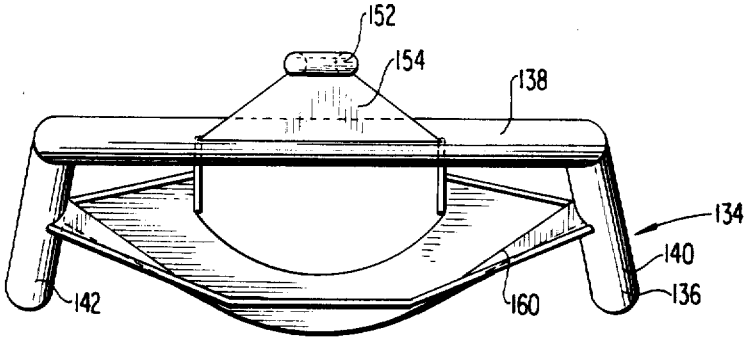
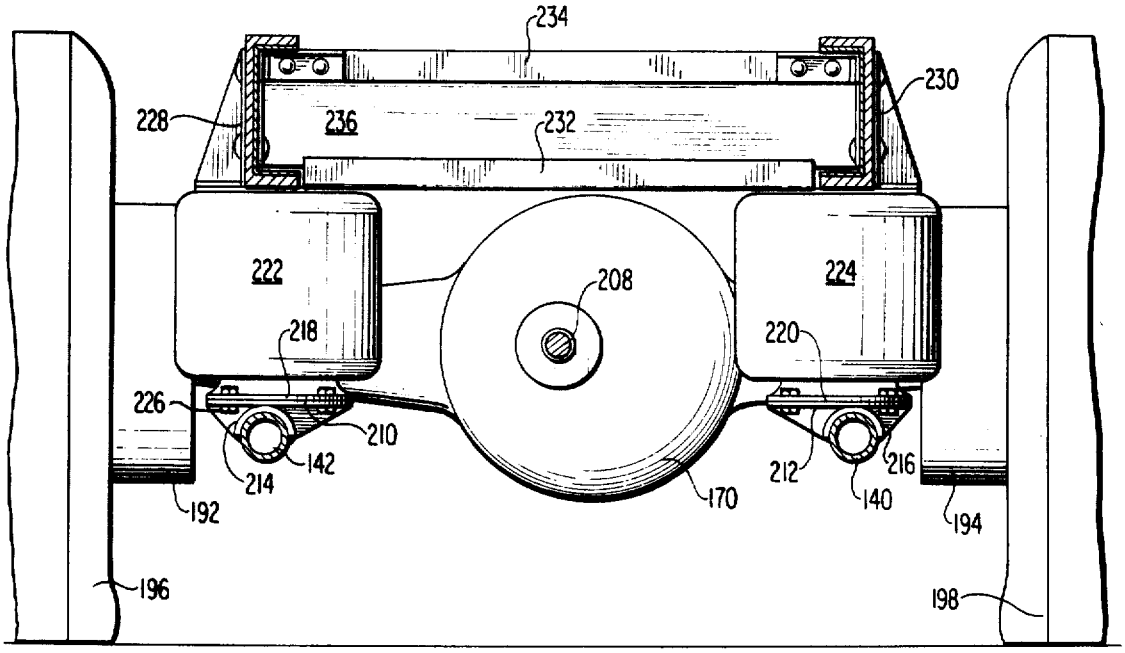
FIG. 9

REMOVABLE VEHICLE CHASSIS SUB-FRAME WITH ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to new and novel improvements in motor vehicles, and more particularly to a heavy duty vehicle such as a tractor-trailer truck combination.

2. Statement of the Prior Art

It has heretofore been proposed to provide removable sub-chassis assemblies for motor vehicles. Examples of prior patented arrangements in the field include the following U.S. patents:

| Patent No. | Patentee | Issued |
|---|---|---|
| 1,198,388 | Winslow | Sept. 12, 1916 |
| 1,484,474 | Cross | Feb. 19, 1924 |
| 1,855,642 | Masury | Apr. 26, 1932 |
| 1,948,744 | Curtiss | Feb. 27, 1934 |
| 1,962,937 | Richman | June 12, 1934 |
| 1,975,366 | Linderman | Oct. 2, 1934 |
| 2,260,804 | Dunham | Oct. 28, 1941 |
| 2,480,047 | Reinhard | Aug. 23, 1949 |
| 2,531,268 | Herrington | Nov. 21, 1950 |
| 2,751,992 | Nallinger | June 26, 1956 |

The foregoing illustrative patents show that prior attempts to provide a removable vehicle chassis sub-frame have been concerned principally with engines mounted either at the forward or rear end of the chassis, thereby imposing the weight of the engine and transmission principally on either a forward or a rear axle.

SUMMARY OF THE INVENTION

The present invention provides a vehicle construction which is particularly suited to heavy duty equipment, and is characterized by mid-length mounting of the engine assembly. This central mounting of the engine and related components has been found to substantially increase payload capacity by improved weight distribution. A co-related principal structural innovation of this invention resides in the detachability of the entire vehicle power train, thereby facilitating servicing and maintenance.

In this construction, the entire vehicle power train, including the engine, transmission, drive shaft and drive axle is secured to the main vehicle frame by a non-complex hitch means. In the event of need for major service or repair, the power train unit is detached and a substitute placed in service thereby freeing the chassis unit from unnecessary deployment from use. The mid-length location of the engine assembly, together with the detachable sub-frame on which this component is mounted, further makes feasible the use of an effective air suspension means for the vehicle. In respect to the latter, the fact that the engine is not front mounted provides sufficient space for the correct location of such air suspension means.

The midship engine location herein provided moreover, makes it possible to locate a fifth wheel hook-up assembly for a trailer at a location which permits load sharing between the axles of the two axle tractor. Thus, the need for a third tractor axle in order to correctly balance the load factor between the axles is eliminated. This location of the engine further provides ample engine space, and permits the use of types of engines other than the conventional internal combustion piston types when desired, such as turbine or other styles.

A further objective of this invention resides in providing a detachable, engine carrying sub-frame which is readily attached and detached, and one wherein the rear suspension comprises a simple combination of air bags and a stabilizer arm. The unit further employs an array of electric, fuel and air quick disconnect plugs which make possible rapid disengagement of the sub-frame from the chassis.

The absence of an engine in the forward frame area of the vehicle results in the provision of ample space for mounting of a forward air suspension means. Further, the necessity for a tilt assembly for the vehicle cab is obviated.

Additional objects and advantages of the invention will become apparent to those skilled in the art from a consideration of the following specification when read in conjunction with the annexed drawings.

BRIEF DESCRIPTION OF THE DRAWINGS

FIG. 7 is a detail sectional view on line 7—7 of FIG. 6;

FIG. 8 is a front view of the sub-frame;

FIG. 9 is a sectional view taken on the approximate plane of line 9—9 of FIG. 4, showing the rear axle unit;

DESCRIPTION OF THE PREFERRED EMBODIMENT

Figure 1:
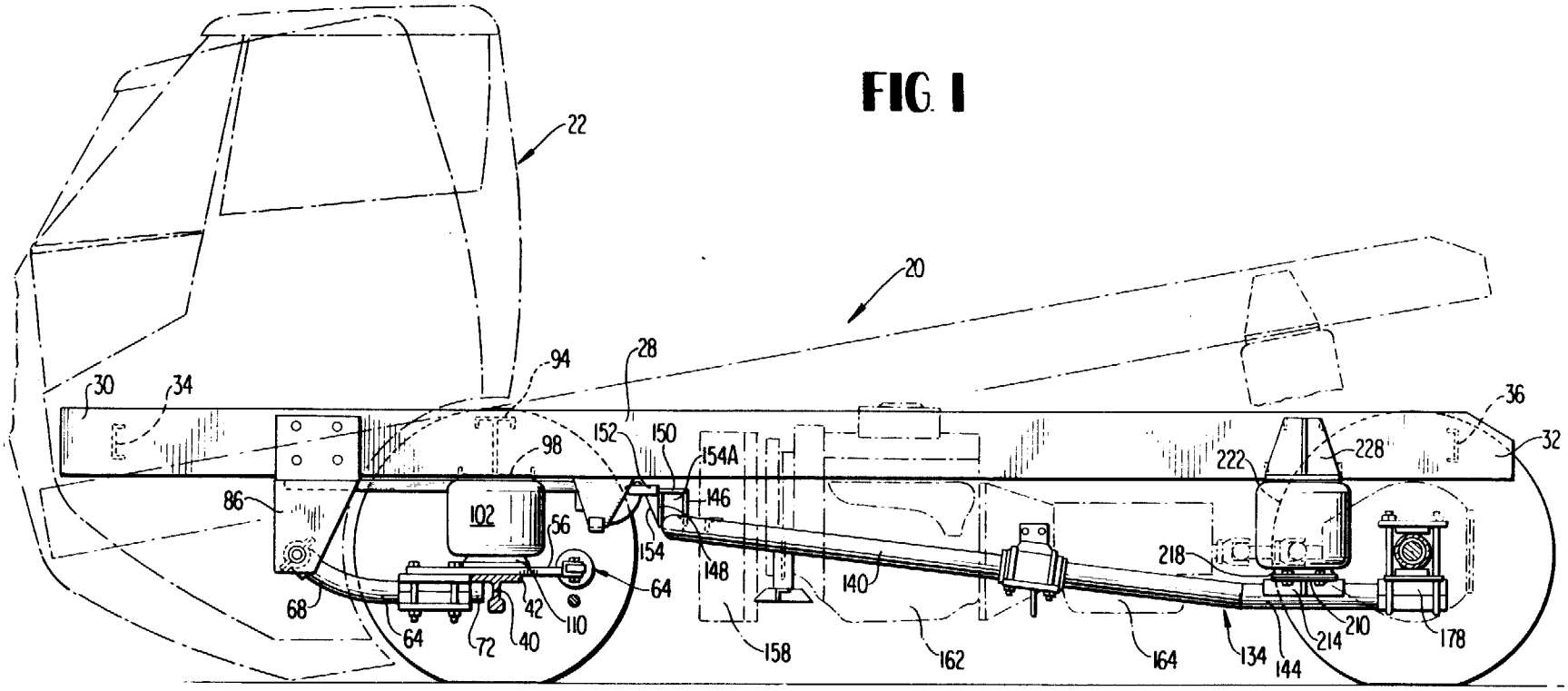
FIG. 1 is a side elevational view of a vehicle constructed and assembled in accordance with the teachings of this invention, showing the main frame and cab in a tilted position in phantom lines for assembly or disassembly.
Figure 4:
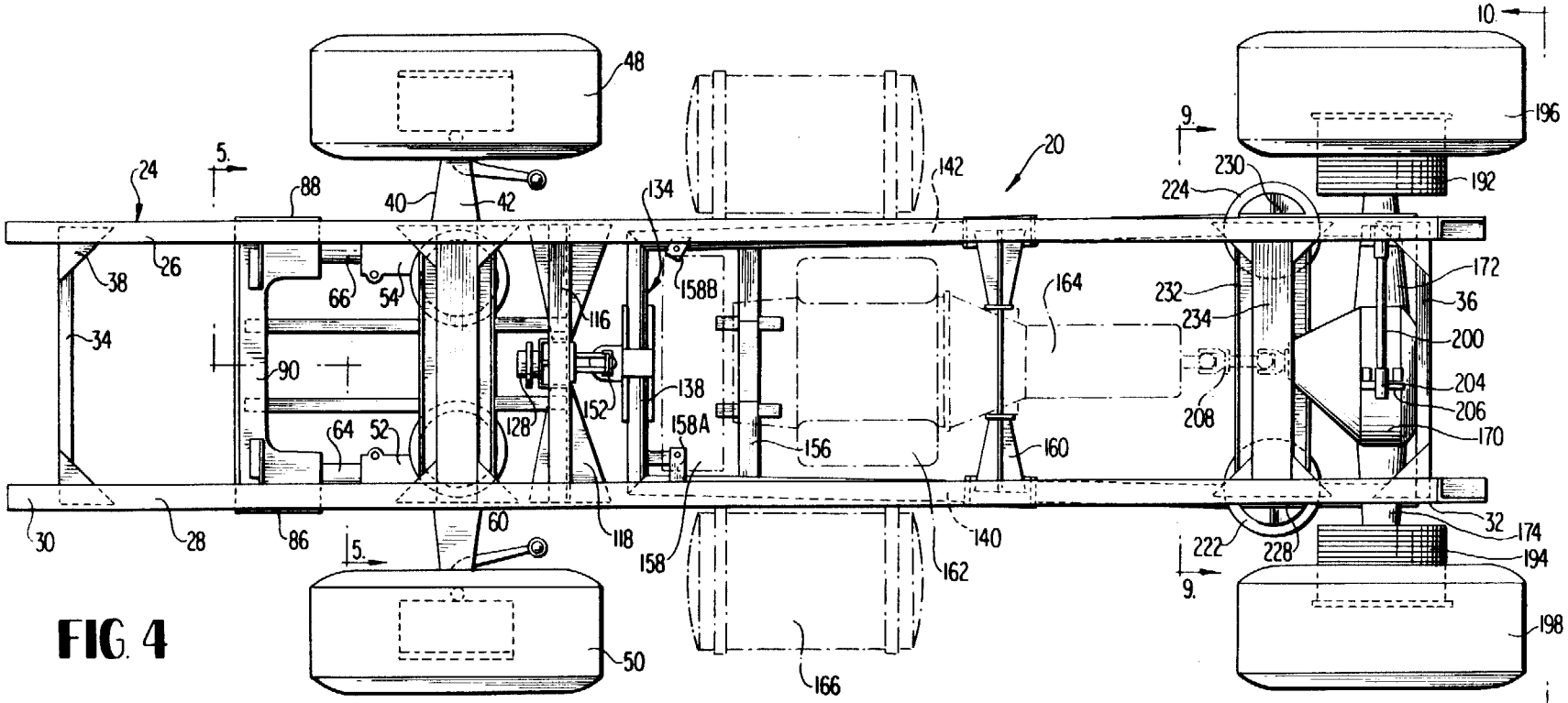
FIG. 4 is a top plan view of the vehicle of FIG. 1, the cab and superstructure being removed for clarity of illustration.

Referring to the drawings in more detail, in FIGS. 1 and 4, a representative embodiment of the invention is shown and is generally designated by reference character 20. The particular design of the cab 22 and other elements of superstructure is without significance to the invention and that illustrated is offered by way of example only. The unit 20 however, comprises a main frame 24 including elongated side frame elements 26 and 28 of conventional channel form. For purposes of reference herein, the frame includes a forward end 30, and a rear end 32.

Frame cross elements are provided at convenient locations, and include a forward cross element 34, and a similar rear cross element 36. Each cross element is formed of channel stock and each is reinforced at its ends by a gusset plate 38.

Figure 5:
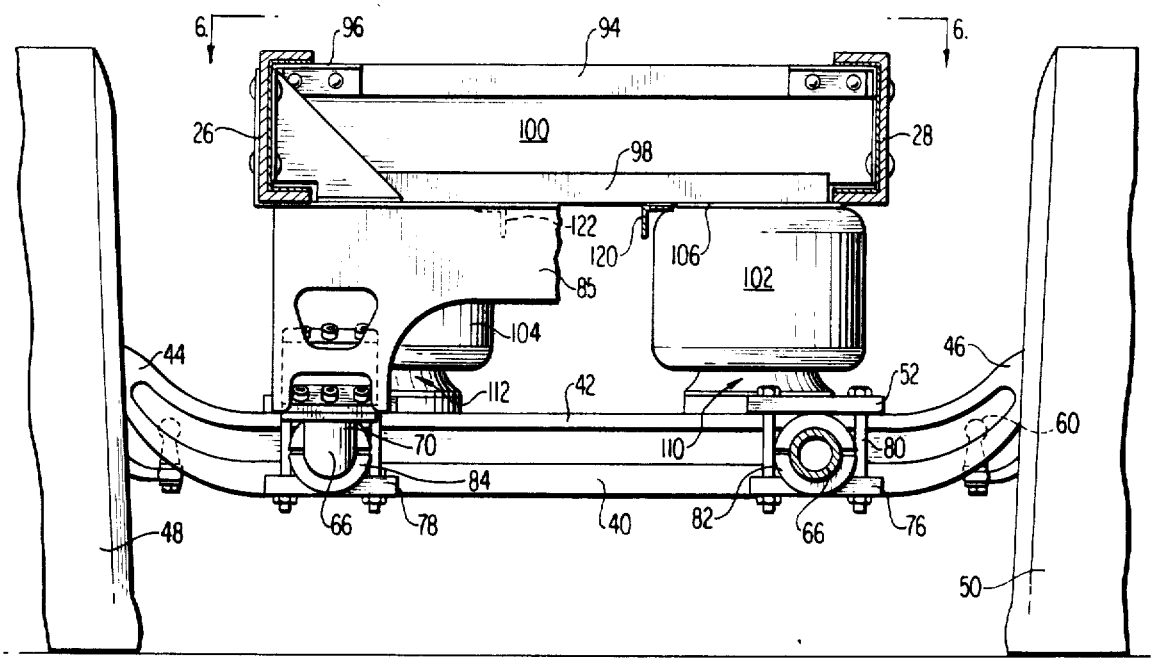
FIG. 5 is an enlarged sectional view taken substantially on the line 5—5 of FIG. 4, showing the forward axle and wheel assembly and the front suspension.
Figure 6:
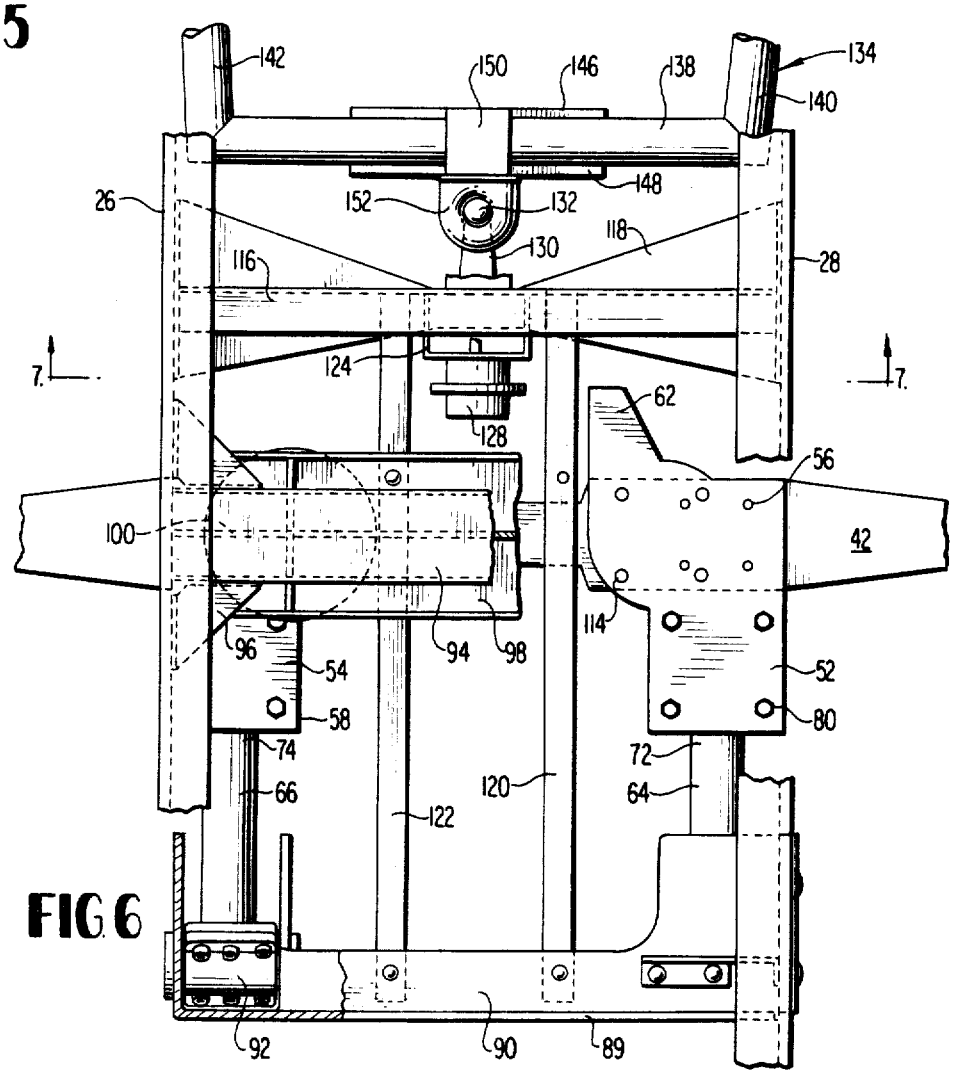
FIG. 6 is a plan view from the plane of the line 6—6 of FIG. 5, looking in the direction of the arrows, showing the hitch means hereof.
Figure 10:
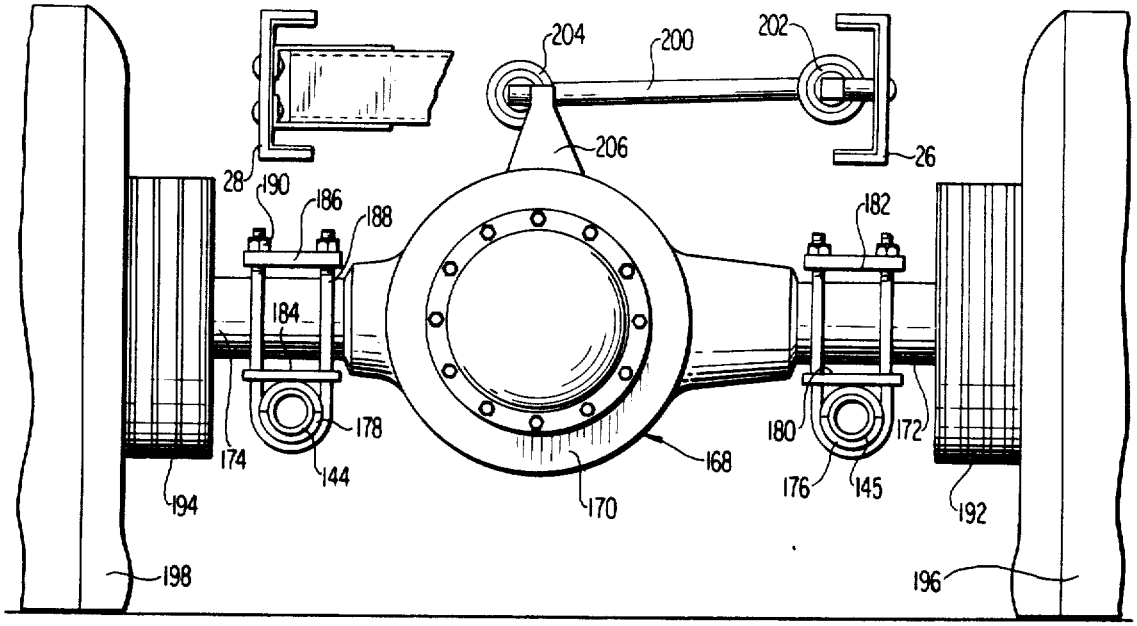
FIG. 10 is a rear elevational view of the rear axle unit from the plane of line 10—10 of FIG. 4.

In FIGS. 5 and 6, a forward axle mounting and assembly is shown. The axle 40 includes an integral top member 42, and has end portions 44, 46, connected, by conventional means not shown, to steerable front ground wheels 48, 50. Plates 52, 54 are fixedly secured by bolts 56 or other fastening means to the member 42, and each plate has a forwardly projecting portion 58. The wheels are each provided with a conventional knuckle 60 for steering purposes. The plate 52 has a rearward extension 62 for mounting of power steering apparatus, indicated generally at 64 in FIG. 1.

An important feature of this invention concerns the provision of a pair of frame pivot arms 64 and 66. The arms have leading upwardly curved ends 68, 70, and trailing ends 72, 74, and are each of tubular construction. The trailing ends 72 and 74 are clamped between the plates 52 and 54, respectively, and bottom clamp plates 76, 78 (FIG. 5), by changeable fasteners 80 of suitable type. If desired, protective split sheaths 82, 84 with rubber bushings are employed in the clamp arrangement. A pair of brackets 86, 88 reinforced by a lateral span 89 depend from the frame sides 26 and 28, and a cross member 90 spans the frame thereat. The brackets support hinges 92 with rubber bushings which serve as pivots for the leading ends 68 and 70 of the arms.

Immediately above the axle 40 the frame side members 26 and 28 are connected by an upper channel 94, reinforced at its ends by gusset plates 96. The bottom flanges of the side frames are similarly spanned by a larger inverted channel 98, the two last named channels being connected by a vertical reinforcing web 100. Forward suspension for the vehicle comprises an air bag suspension system heretofore employed exclusively in rear suspension systems due to bulk. The system hereof comprises conventional air bags 102, 104 of enlarged size, secured by their upper flanges 106 to bear against the channel member 98. The base 110, 112 of the bags are suitably secured to the plates 52 and 54 by appropriate fasteners 114.

Rearwardly by the axle and front suspension, the side frames are connected by a further cross member 116. Enlarged reinforcing members 118 are secured to the member 116, and longitudinal braces 120, 122 extend therefrom to the member 90. A bracket 124 is secured to member 116, and a pneumatic or other fluid operated cylinder 128 controls extension and retraction of a hitch 130 with a connector 132.

This invention has, as a major feature thereof, a totally independent power unit 134, a main component of which is a power unit sub-frame 136 including a bight portion or transverse rod 138, and elongated side rods 140, 142. Each of the side rods has a distal end 144, 145 angularly related to the main extent thereof, and a pair of brackets 146, 148 are centrally fixed in an upright position on the bight or transverse rod 138. These are connected by a top brace 150 having a portion 152 which embraces the connector 132 of the hitch. The eye member may be further embraced by a bottom plate 154 and 154A.

The side rods 140, 142 are spanned at various locations by apparatus for mounting of an engine and related accessories. For example, two mounts 158A and 158B for a radiator assembly 158. A front mount 156 and a spanning engine mount 160 for an engine 162 and transmission 164 are provided. Fuel tanks 166 for the engine are mounted outboard on the frame sides, as shown in FIG. 4.

The power unit 134 further includes a rear axle assembly 168 having a differential housing 170 and shaft housings 172, 174. The latter are clamped about the distal ends 144, 145 of the sub-frame side rods by clamps which include split sleeves 176, 178, upper and lower housing engagement blocks 180, 182, and 184, 186, and inverted U-bolts 188 with locking nuts 190. The axle housing terminates at brake assemblies 192, 194, for rear ground wheels 196 and 198.

The rear axle mount is stabilized by a stabilizer bar 200 having a connector 202 releasably secured to the frame side 26 for pivotal movement thereat. A second stabilizer connector 204 is releasably and pivotally engaged to an upstanding lug 206 on the differential housing 170. The housing is operatively associated with the transmission 164 through a drive shaft 208.

At a location forward of the rear axle assembly, rear suspension means is provided between the sub-frame and the main frame. In FIGS. 1, 4 and 9, it will be observed that mounting plates 210, 212 with depending supports 214, 216 are fixedly secured to the rod distal ends. The lower portions 218, 220 of air bag suspension members 222, 224 are secured to these plates by changeable fasteners 226. At their respective upper ends, the air bags are supplied with mounting brackets which include vertical members 228, 230 which are fixed, as by riveting, to the frame sides. The frame is reinforced laterally at the location of the suspension means by a lower channel 232, an upper channel 234, and a vertical web member 236.

Figure 11:
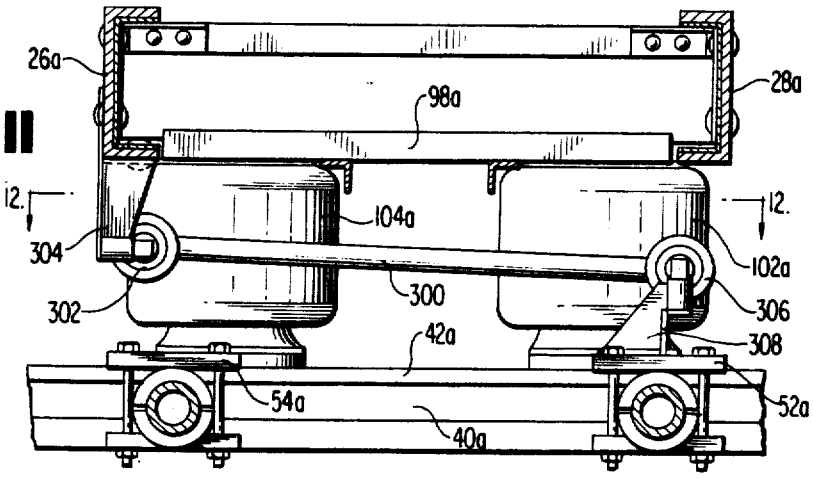
FIG. 11 is a view similar to FIG. 5 showing an alternate front suspension construction.
Figure 12:
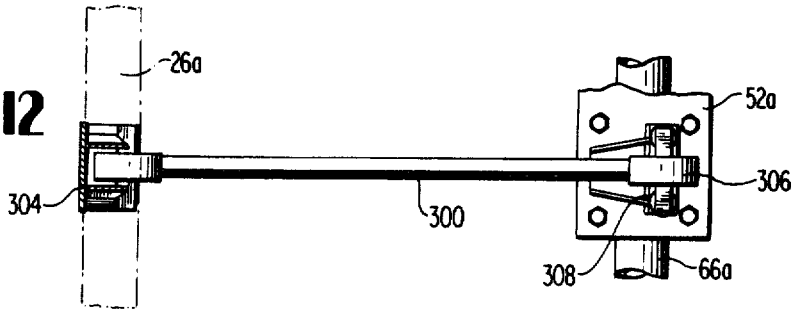
FIG. 12 is a cross section showing details, taken on line 12—12 of FIG. 11, looking in the direction of the arrows.

The forward suspension means may be modified in the case of extremely heavy vehicles in the manner shown in FIGS. 11 and 12. There, air bags 102a and 104a are again mounted between a channel 98a and an upper member 42a of an axle 40a. In addition, a forward stabilizer bar 300 has a first connector 302 engaged on a bracket 304 depending from the frame side 26a, and a second connector 306 pivotally mounted in an upstanding bracket 308 secured on the plate 52a.

Figure 2:
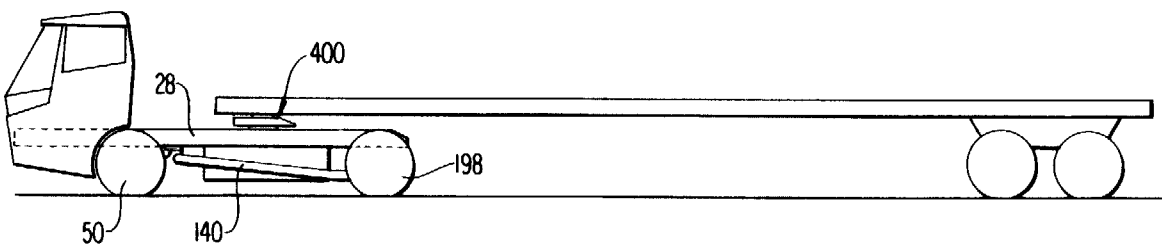
FIG. 2 is a diagrammatic side elevational view of an assembled unit as used for a prime mover and single trailer.
Figure 3:
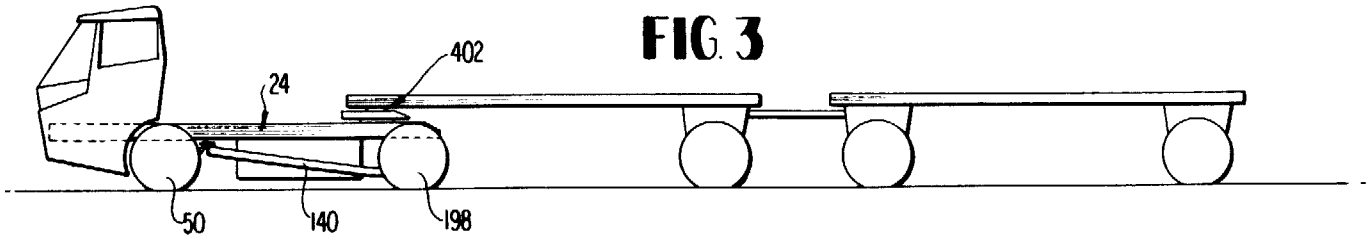
FIG. 3 is a diagrammatic view similar to FIG. 2, showing the unit as embodied in a tandem trailer unit.

In FIGS. 2 and 3, diagrammatic sketches show the adaptability of the vehicle hereof to load distribution. In FIG. 2, a single trailer is shown, and the trailer hitch or fifth wheel 400 has been located at a midship location on the tractor frame. The tandem trailer arrangement of FIG. 3 however, provides improved efficiency and handling characteristics by shifting of the trailer hook-up 402 to an aft position.

Figure 13:
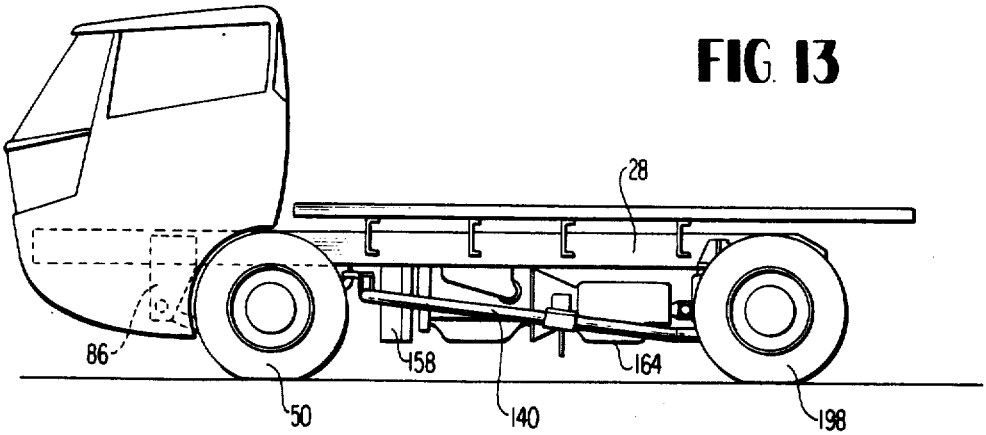
FIG. 13 is a side elevational view of an assembled unit.
Figure 14:
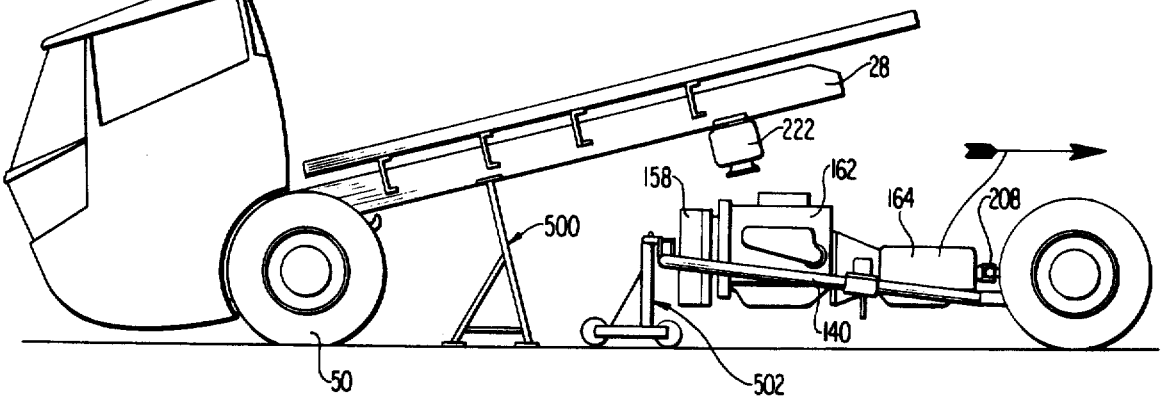
FIG. 14 shows the unit of FIG. 13 in the process of being disassembled.
Figure 15:
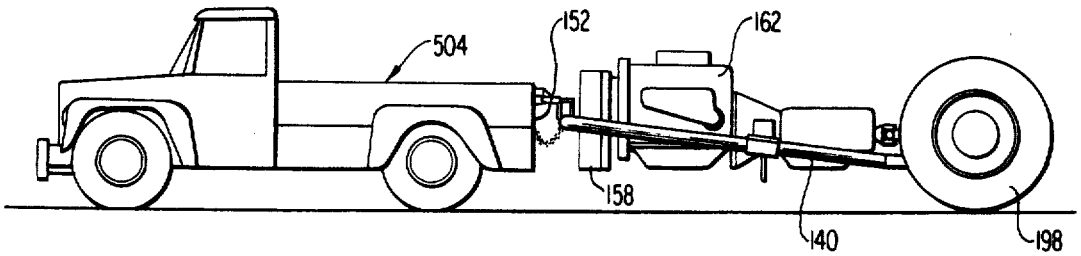
FIG. 15 discloses transport of a detached unit.

FIGS. 13 through 15 best illustrate the principal advantages and manner of use of the construction provided hereby. In FIG. 13 an assembled unit as heretofore described is shown. In FIG. 14, the main frame has been tilted forwardly following disengagement of the rear air bags from their lower mounting sections and disconnect of the electrical and fluid controls for the power unit. These controls are located, as indicated above, in an array adjacent the hitch (not shown). The tilted frame and cab, previously raised by any suitable jack means to the position shown, is supported on a standard 500, and the drive unit is placed on a dolly 502 for movement to a repair or replacement location. FIG. 15 shows the unit as being towed to another location by a truck 504.

I claim:

1. In a motor vehicle:

a frame having frame side elements and cross elements, including at least one fixed intermediate cross element, connecting the side elements;

a cab mounted to the frame;

a fifth wheel mounted to the frame rearwardly of the cab for connection to a trailer that overhangs the frame rearwardly of the cab;

a front axle having steerable ground wheels thereon;

front suspension air bag means for the front axle interposed between the front axle and the side elements;

a power unit comprising a power unit sub-frame including a transverse forward rod and side rods fixed to and extending rearwardly of the forward rod below the side elements, the side rods having rearward distal ends;

a single hitch means, located rearwardly of the front axle, releasably connecting the center of the forward rod to the center of the intermediate cross element;

a rear axle assembly, having ground wheels and having a differential assembly, secured to the distal ends of the side rods;

rear suspension means interposed between the side rods and the side elements proximate to the rear axle assembly;

means securing the rear suspension means to the side rods and the side elements including releasable securing means securing the rear suspension means to at least one of the side rods and the side elements;

engine mounting means extending between the side rods between the hitch means and the rear axle assembly; and an engine assembly, including an engine, secured on said mounting means and located between the hitch means and the rear axle assembly.

2. The invention of claim 1, wherein:

the rear suspension means comprises a series of air bags.

3. The invention of claim 1, and:

a stabilizer rod releasably secured between the differential assembly and the frame.

4. The invention of claim 1, and:

a stabilizer rod secured between the frame and the front suspension means.

5. In a vehicle:

a frame having side elements;

a front axle, having steerable ground wheels thereon, secured to forwardly projecting frame pivot arms, the frame pivot arms being pivotally secured at their front ends to the frame side elements;

yieldable suspension means mounted between the pivot arms and the frame side elements;

hitch means spanning the frame side elements rearwardly of the front axle;

a power unit, including a sub-frame having hitch connection means, releasably engaged with and extending rearwardly of the hitch means;

a rear axle, having ground wheels, secured to the sub-frame rearwardly of the hitch means;

yieldable suspension means releasably interposed between the sub-frame and the main frame; and an engine assembly mounted to the sub-frame between the hitch means and the rear axle.

6. The invention of claim 5, wherein:

the yieldable suspension means comprise air bags.

7. The invention of claim 5, and:

a power train assembly operatively mounted on the sub-frame.

8. The invention of claim 5, and:

a longitudinally movable fifth wheel assembly on the main frame.

*9. In a motor vehicle:*

*a frame having side frame elements and cross elements connecting the side elements;*

*a cab mounted to the frame;*

*a fifth wheel mounted to the frame rearwardly of the cab for connection to a trailer that overhangs the frame rearwardly of the cab;*

*a front axle having steerable ground wheels thereon;*

*yieldable front suspension means for the front axle disposed between the front axle and the side elements;*

*a rear axle assembly, having ground wheels thereon and having a differential assembly;*

*hitch means located between the front and rear axles;*

*a power unit comprising a power unit sub-frame including side rods extending rearwardly of the hitch means below the side elements, the side rods having forward ends and rearward distal ends, and the rear axle assembly being secured to the distal ends of the side rods;*

*the side rods being releasably connected by the hitch means with the side frame elements;*

*rear suspension means disposed between the side rods and the side elements proximate to the rear axle assembly;*

*means securing the rear suspension means to the side rods and the side elements including releasable securing means securing the rear suspension means to at least one of the side rods and the side elements;*

*engine mounting means extending between the side rods between the hitch means and the rear axle assembly; and*

*an engine assembly, including an engine, secured to the engine mounting means and located between the hitch means and the rear axle assembly.*

*10. In a vehicle:*

*a frame having side elements;*

*a front axle, having steerable ground wheels thereon, secured to forwardly projecting frame pivot arms, the frame pivot arms being pivotally secured at their front ends to the frame side elements;*

*yieldable suspension means mounted between the pivot arms and the frame side elements;*

*a rear axle having ground wheels thereon;*

*hitch means on the frame side elements located between the front and rear axles;*

*a power unit, including a sub-frame having hitch connection means, releasably engaged with and extending rearwardly of the hitch means, the rear axle being secured to the sub-frame rearwardly of the*

*hitch means;*

*yieldable suspension means releasably disposed between the sub-frame and the main frame; and*

*an engine assembly mounted to the sub-frame between the hitch means and the rear axle.*

* * * * *